United States Patent [19]

Diekemper

[11] Patent Number: 5,000,125
[45] Date of Patent: Mar. 19, 1991

[54] ANIMAL COLLARS

[76] Inventor: Ronald H. Diekemper, R.R. #, Box 600, Sandoval, Ill. 62882

[21] Appl. No.: 454,435

[22] Filed: Dec. 21, 1989

[51] Int. Cl.⁵ ............................................ A01K 27/00
[52] U.S. Cl. ..................................................... 119/106
[58] Field of Search ........................ 119/96, 106, 109; 54/19 R, 19 B, 21; 40/300, 303, 304; 24/16 PB, 30.5 P

[56] References Cited

U.S. PATENT DOCUMENTS

| | | | |
|---|---|---|---|
| 1,688,261 | 10/1928 | Branner | 119/106 |
| 1,903,081 | 3/1933 | Wotherspoon | 119/96 |
| 2,101,586 | 12/1937 | Leach | 40/304 |
| 2,791,202 | 5/1957 | Doyle | 119/106 |
| 3,104,650 | 9/1963 | Grohling | 119/109 |
| 3,952,438 | 4/1976 | Propst et al. | 40/300 |
| 4,788,751 | 12/1988 | Shely et al. | 24/16 PB |
| 4,881,301 | 11/1989 | Sweeney et al. | 24/16 PBX |

FOREIGN PATENT DOCUMENTS 2201076 8/1988 United Kingdom ................ 119/106

Primary Examiner—Gene Mancene
Assistant Examiner—R. Thomas Price
Attorney, Agent, or Firm—Haverstock, Garrett and Roberts

[57] ABSTRACT

An animal collar formed from a continuous generally flexible strap made from a plastic material having a series of slots adjacent one end of the strap and a buckle adjacent the other end of the strap, the buckle having a pair of openings with a latch projecting upward between the openings adapted to be mated with one of the slots when the end of the strap containing the slots is inserted through the pair of openings in the buckle, the strap having a pair of opposed inset projections on the side of the strap adapted to be the front of the collar when the collar is installed on a pig and adapted to retain the collar in place back of the ears and upper skull bones of a pig.

13 Claims, 1 Drawing Sheet

ANIMAL COLLARS

The present invention relates generally to animal collars which are used for a wide variety of uses such as identification and carrying devices used in the production and utilization of animals.

BACKGROUND OF THE INVENTION

Livestock farming has become bigger and more intense as well as fiercely competitive. Hog farming in particular requires the successful utilization of better breeding, optimum feeding and intensive marketing to be successful. Genetic engineering is continuing to create leaner and heavier hogs for market. The development of swine somatatropin has resulted in the potential for production of larger litters, more milk from the mother sows and healthier piglets which grow faster.

With the movement to larger producers, some now producing from 25,000 to 50,000 market hogs per year, controlled breeding, farrowing, feeding and finishing practices have become an economic necessity. Boars with good performance records and good breeding readings are an essential component of successful hog farming. As a general practice, pure bred boars are mated with cross bred sows and gilts to produce an offspring which can be fed to 240 pounds in 180 days. By utilizing computer record keeping and microprocessors to individualize feed and water per animal, the production of big and lean pigs for market can be optimized.

Swine appears to be the only mammal wherein artificial insemination is ineffective. Extensive testing of artificial insemination has resulted in low conception rates and litters consisting of one to two piglets. Thus, the selection and utilization of the best boars with the best producing sows and gilts becomes an imperative for swine farmers. Also, this practice is very labor intensive so every aid must be employed by the swine producer to maximize his effectiveness. Thus, it becomes important to be able to identify each sow or gilt mated with a particular boar in order to complete reliable records as a basis for selecting animals for future production. In fact, it is now possible for a computer to regulate through a microprocessor system the precise amount of feed and water for each particular animal per day by coding input into the microprocessor to trigger a mechanism to release the indicated amounts of feed and water when a particular animal enters a private stall.

For many years, metal and plastic ear tags have been used to identify particular animals such as pigs. Although used for many years, tags have never been completely satisfactory because they tend to become illegible with dirt, they are easily pulled off during rubbing or fighting, they are inaccessible when the pig is lying or standing in a particular position, they are impossible to read when the pig is moving and grouping is impossible. More recently, collars for animals such as pigs have been made from flexible webbing material such as nylon but such collars are not completely adequate either. Being made from web material, they tend to stretch and are easily rubbed off. Also, they can be chewed in two during fighting or the mating ritual. Tests have shown that it is very difficult to maintain flexible web collars for any extended period of time.

SUMMARY OF THE INVENTION

The problems encountered in use of prior animal identification systems are overcome by the present invention which is comprised of an animal collar, particularly suitable for use on hogs, which is made from a high hinge-ability plastic which is used to provide a collar which will lock behind the ears of a hog and which will adapt to the neck configuration of the hog to provide a comfortable collar. This invention is characterized by projections on each side which curve inwardly from the plane of the strap of the collar to provide a means for locking the collar in place behind the upper skull bone from which the pigs ears project and thus making it almost impossible to be removed by rubbing, biting etc.

Also included in this invention are spaced apart inward projections projecting inwardly from the plane of the strap of the collar on one side of the collar, preferably in series and preferably projecting down towards the latching means for attaching the collar to the hog. These inward projections are primarily intended to retain the end of the strap of the collar on the inside between the shoulder of the animal and the collar to secure the collar in attached position.

Because hogs are known to rub against posts and engage in occasional fights, the latching mechanism for attaching the collar of this invention in place is particularly important. One end of the strap has spaced apart openings in the nature of slots which may be rounded on each end to help prevent cracking and tearing when a collar is in use on the animal. The other end of the strap includes a buckle arrangement which is usually molded-in-place. Preferably, the buckle is curved slightly inward from the plane of the strap to provide easier access to the other end of the strap containing the slots and in order to provide a smoother surface when the end of the strap containing the slots is latched in place with the other end of the strap which contains the buckle.

The buckle of the collar of this invention is preferably molded-in-place on the end of the strap opposite from the end containing the slots and is somewhat extended outwardly in order to provide the openings and to accept the end of the strap containing the slots. The outer extremity of the buckle contains an enlongated opening through which the end of the strap containing the slots may be inserted. On the outside of the outer opening the buckle is curved outwardly with a molded-in-place reverse curve so that the end of the strap containing the slots may be inserted directly into the buckle and when latched in place the curved outer portion of the buckle will generally rest against the surface of the inserted end of the strap which helps prevent inadvertent tearing or breaking or otherwise damaging the buckle while in service. Molded into the inner depressed portion of the buckle is an elongated opening with a tongue projecting inward and curving upward from the outer most side of the opening. The tongue is adapted to fit into one of the slots in the opposite end of the strap so that the end may be inserted in the opening with the tongue projecting up through the slot to lock the collar in place about the hog. When the opposite ends of the strap are thus locked in place, the end of the strap containing the slots will project along the inside of the end of the strap containing the buckle to the extent necessary to create a snug fit about the shoulder of the hog.

Preferably, the tongue will have a reinforcing bar element molded into the tongue at the point of angle where the tongue curves upwardly because this is the point of maximum stress when the collar is in place about the hog.

In order to provide easy access to the end of the strap projecting inwardly beyond the buckle when it is desired to remove the collar, a projection may be molded into or added onto the inner surface of the strap adjacent to the buckle transverse to the strap in order to provide a finger opening.

At the upper end of the collar opposite the attachment ends, the curved portion may be flattened out somewhat and molded with an angle projecting outward and upward in order to accomodate the head configuration of a pig. Also, an optional upwardly extending flap adjacent to the front side of the collar may be molded in place for the purpose of carrying identification data.

Optionally, one or both portions of the strap projecting downwardly from the upper portion and adapted to abut the upper shoulder area of the hog may be widened in order to strengthen the strap at the point of maximum stress when in use on the hog. Also, optionally, as a matter of convenience the width of the strap may be slightly narrowed near the buckle end in order to make it somewhat easier to insert fingers for the purpose of removing the extension of the strap containing the slots to remove the collar from the hog.

Since the collar is used primarily for the purpose of identification of particular animals, various means may be included for carrying identification information and for retaining devices such as microprocessors. The quick easy means of identification is to apply a self-adhering strip containing identification information about the upper portion of the collar. Such strips are commercially marketed as No. 145 vinyl tapes by Formel Adhesive Products, Incorporated, West Haven, Conn. 06516. Such strips stick tightly to the surface of the collar but are removable and replaceable when it is desired to remove the collar from one hog and reuse the same collar on another hog. Other means of identification are also included in this invention such as molded end slots for insertion of rigid removable plates, openings for bolting or riveting identification plates to the outer surface of the strap of the collar, and any other means known to the art.

The preferred material of construction of the collar of this invention is high density polyethylene. A particularly useful high density polyethylene is marketed by Poly-Hi Corp., Fort Wayne, Ind., 46899 in 4 feet by 8 feet sheets. Other polyolefins may be used in the practice of this invention such as low density polyethylene and polypropylene. Other moldable plastic materials may also be used in constructing the animal collars of this invention including polyamides, (nylons), polyvinylchloride resins, acrylonitrile-butadiene-styrene copolymers, stryene-butadiene copolymers, polyurethanes, polycarbonates and any other moldable plastic composition. To add strength, the plastic materials may be reinforced with fibers such as glass fibers or fine wire fibers.

The collar of this invention has been described in connection with its primary use in identifying hogs. In practice, different colored plastic collars may be used to identify different groupings of hogs and a numbering system may be used to identify hogs within the group. For example, optimizing the production of pork for market, it is important to be able to identify a particular sow or gilt being bred by a particular boar. This can be done by personal observation and recording the mating animals in a recording system such as a computer program. From this data the efficacy of the particular hogs involved can be evaluated and the less productive animals can be culled from the system.

Also, the collar of this invention may contain an attachment device to which may be attached devices such as a microprocessor which may be programmed to do various things. One use for such a microprocessor would be to program the microprocessor to trigger a mechanism to supply a predetermined amount of feed and water for a particular animal which can be quickly trained to enter a private stall for such feeding and watering. Also, it is possible to include a microprocessor on a breeding sow or gilt and include a companion microprocessor on a collar on the mating boar and automatically record the mating combination on a computer program which could be easily printed out and included in permanent records.

Although the invention has been described with reference to use in connection with swine (hogs, pigs, sows, gilts and boars), the collars can be adapted to and used in connection with other animals, particularly dairy and beef cows.

DETAILED DESCRIPTION OF THE INVENTION

With reference to the drawings, like numbers refer to like parts in each of the figures.

Figure 1:
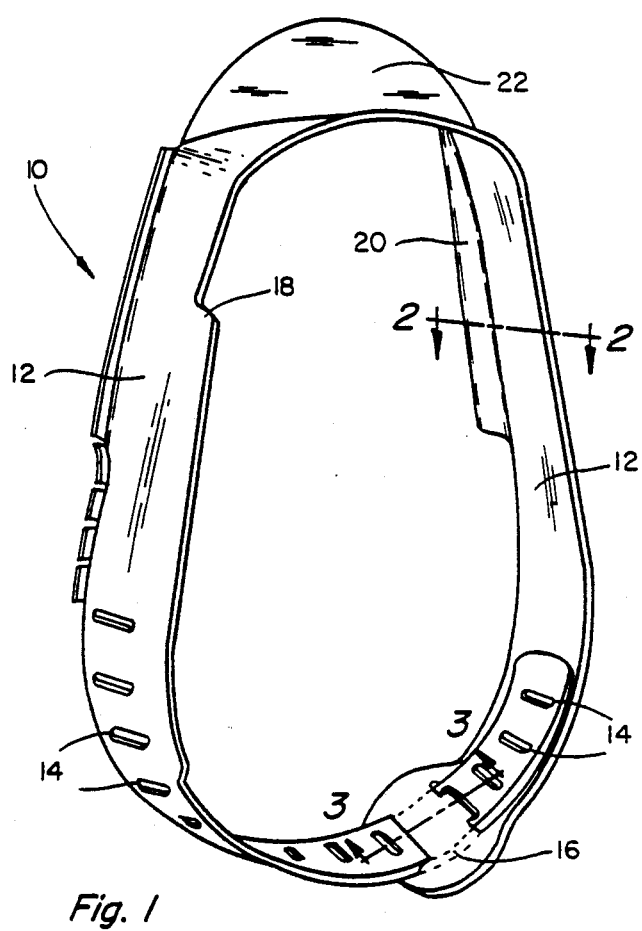
FIG. 1 is a perspective of the animal collar of this invention.

Referring to FIG. 1, collar 10 includes strap 12 which is intended to encircle the neck of the pig and serve to identify a particular pig. Strap 12 may be molded in a generally elliptical configuration to accommodate the shoulder area of a hog as shown in FIG. 1. Strap 12 must be wide enough and thick enough to withstand the vigorous use encountered when in use on a pig. Although not critical, the strap will be generally about 1 inch to 3 inches wide at the end portions containing the slots and the buckle and will be generally about 1¾ inches wide. At the wider portions of the strap which is adapted to abut the upper shoulder portion of a pig, the strap will be generally about 2 to about 4 inches wide, with about 2¼ inches wide being adequate for most purposes. The thickness of the strap of this collar is not critical but the strap must be thick enough to withstand vigorous use and thin enough to maintain some flexibility. The thickness of the strap may range from about 3/64 inch to 3/16 inch or more and for most purposes a thickness of about 1/16 inch to 3/32 inch is adequate.

Strap 12 will include a series of slots 14 which are elongated and transverse to strap 12 and adapted for insertion into buckle 16 to lock collar 10 in place about a hog. Strap 12 may include a widened strip 18 near the upper portion of collar 10 to strengthen strap 12 at a point subjected to maximum stress and abrasion when in place on the hog.

Inset projections 20 are molded into strap 12 near the upper portions and adapted to fit immediately behind the ear and upper skull bone portion (external acoustic meatus) of the pig when the collar is in service to prevent the collar from being removed by slipping it over the head of the pig. Inset projections 20 are preferably molded in at a slight angle and curved to form a lip so that collar 10 may be locked into position on the hog with maximum security and minimum irritation to the hog. Inset projections 20 may optionally include a relief notch located slightly below the mid-point between the top and the bottom so that collar 10 may fit more snuggly about the neck of a hog, particularly when employed on small sows and gilts.

Strap 12 may have molded thereto flap 22 in the middle thereof and adapted to project upward when the collar is in place to provide an optimum location for an identification number.

Figure 2:
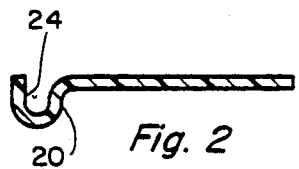
FIG. 2 is cross section of the collar taken along line 2—2 of FIG. 1.

FIG. 2 shows inset projection 20 with lip 24 adapted to rest gently against the upper shoulder of the hog when collar 10 is in place. Lip 24 optionally may be completely closed and thus in the form of a solid or completely closed loop which may be desirable in molding collar 10 by an injection molding process.

Figure 3:
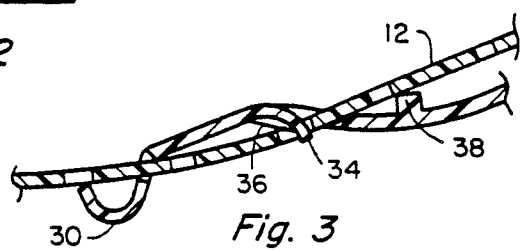
FIG. 3 is a cross section of the buckle and strap ends of this collar taken along line 3—3 of FIG. 1.

FIG. 3 shows buckle 16 in interlocked connection with the end of strap 12 which contains slots 14.

Figure 4:
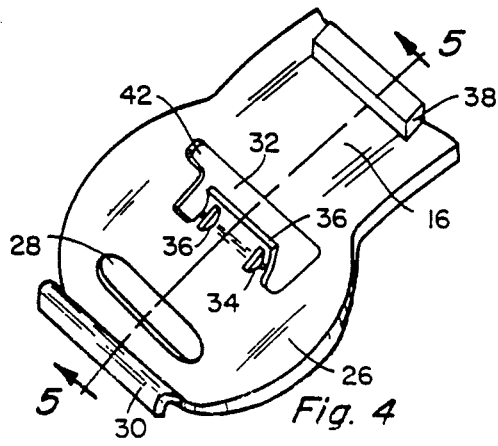
FIG. 4 is a perspective of the buckle on the collar of this invention.

FIG. 4 shows buckle 16 as a molded extension of one end of strap 12. Buckle 16 contains widened portions 26 in order to strengthen buckle 16 and provide adequate space for inserting the other end of strap 12. Near the outer extremity of widened portions 26 is elongated opening 28, preferably rounded on the outer ends, to accommodate the end of strap 12 when the collar 10 is locked in place. Ridge 30 is molded into the outer edge of buckle 16 and curved to provide means for resting the outer edge of the buckle on the outer surface of the other end of strap 12 when collar 10 is in place on a hog. This optional projection prevents inadvertent disengagement or damage to the buckle. Latch opening 32 has a release notch 42 molded into the outer most portion thereof latch 34 which is a molded raised portion adapted to fit into slots 14 when the two ends of strap 12 are placed together in locking engagement. Reinforcing rib(s) 36 are molded into buckle 16 in order to reinforce latch 34 because this is a point of maximum stress during use of collar 10 to identify a particular pig. When placed in use, the end of strap 12 which contains slots 14 is inserted from the underside of buckle 16 through elongated opening 28, across the top of buckle 16 and down through latch opening 32 whereby latch 34 mates into one of slots 14 to lock collar 10 in place about the head and shoulder portion of a pig.

Figure 6:
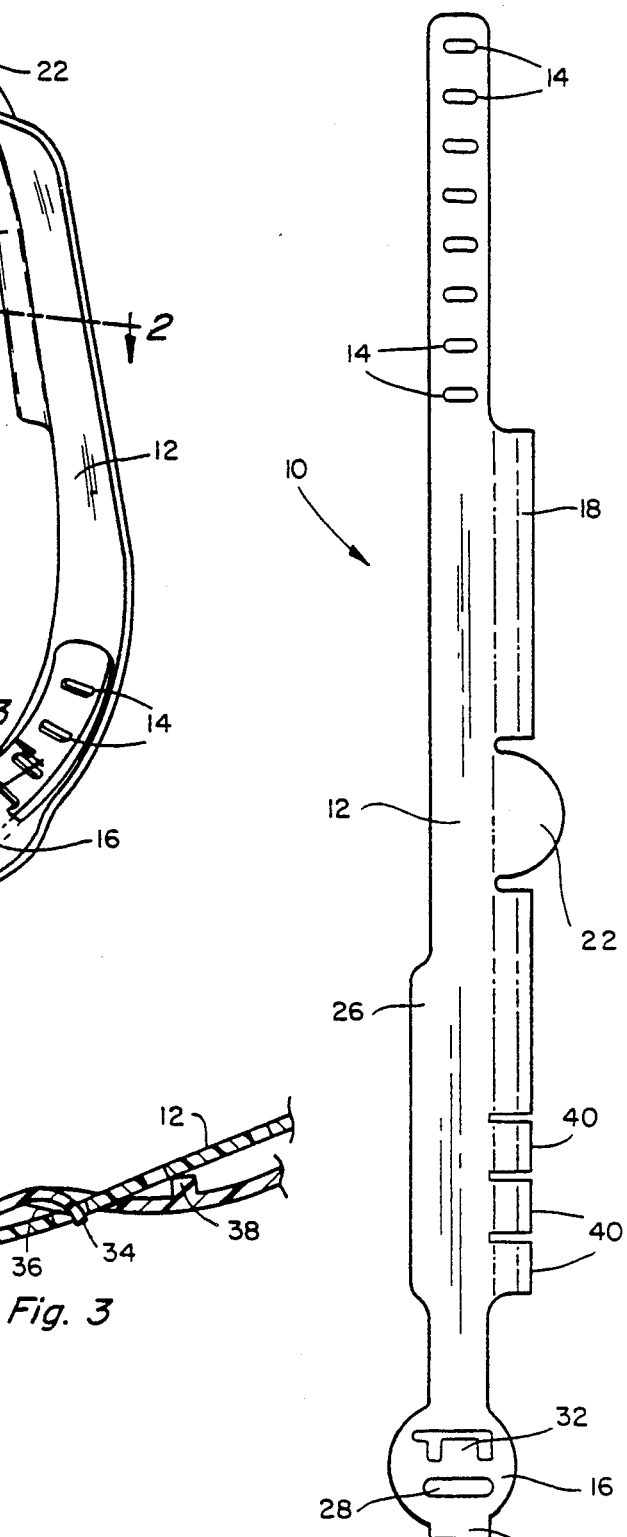
FIG. 6 is a top plan view of the collar of this invention.
Figure 5:
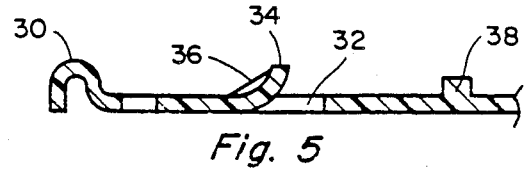
FIG. 5 is a cross section of the buckle taken along line 5—5 of FIG. 4.

Baffle 38 may be optionally included on the inner side of strap 12 near buckle 16 in order to provide finger access to the end of strap 12 when it is desired to remove the collar from a hog. As best shown in FIG. 6, relief projections 40 may be optionally molded into the edge of strap 12 near buckle 16 and are adapted to provide flexibility with strength at the point in collar 10 which must adapt to the contour of the shoulder area of the hog when collar 10 is in place.

Optional release notch 42 on buckle 16 is used to release the end of strap 12 which contains slots 14 when it is locked in place. As slot 14 is pushed forward past latch 34 the end of strap 12, which contains slots 14, is pushed over into notch 42 by inserting fingers under the narrowed portion in back of buckle 16 and then while fingers are holding the strap over in notch 42 the end of strap 12 with slots 14 is pulled out of buckle 16 with other hand.

Thus, there has been shown and described a novel animal collar adapted for use in identifying animals. Many changes, modifications, variations and other uses and applications of the present construction will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

I claim:

1. An animal collar comprised of a continuous strap of plastic material having a series of slots adjacent one end of said strap and a buckle adjacent the other end of said strap, said buckle having a pair of openings with a latch means projecting upward between said openings adapted to be mated with one of said slots when the end of said strap containing said slots is inserted through said pair of openings in said buckle, said strap having a pair of opposed inset projections on the side of said strap adapted to be the front of said collar when said collar is installed on a pig and adapted to retain said collar in place back of the ears and upper skull bones of a pig.

2. The animal collar defined in claim 1 wherein said strap contains a widened portion adjacent at least one of said opposed inset projections in order to strenghten the collar when in place about a pig.

3. The animal collar of claim 1 wherein said slots are rounded at the extremities to prevent points of weakness.

4. The animal collar of claim 1 having a flap extending upwardly from said strap when said collar is in place on a pig adapted to contain an identification.

5. The animal collar of claim 1 having opposed inset projections on the upper side of said continuous strap of said collar adapted to lock said collar in place behind the ears and upper skull bones of a pig.

6. The animal collar defined in claim 1 wherein said buckle is comprised of a pair of elongated openings with a latch means projecting upward between said elongated openings.

7. The animal collar defined in claim 6 wherein the said continuous strap includes a relief notch extension adapted to provide easy access to unlatch said strap from said buckle.

8. The animal collar defined in claim 6 wherein said latch means has a reinforcing means to prevent inadvertent bending or breaking of said latch means.

9. The animal collar defined in claim 6 wherein said buckle has attached thereto a transverse ridge adapted to secure said strap with said slots in place.

10. The animal collar defined in claim 9 wherein said transverse ridge has an outer curved portion adapted to rest against said strap containing slots when the ends of said strap are locked together though said buckle.

11. The animal collar defined in claim 1 wherein said strap has a transverse baffle on said strap near said buckle adapted to form a finger insert when it is desirable to unlatch the collar to remove it from a pig.

12. The animal collar defined in claim 1 wherein said strap is made from a thermoset polymeric material selected from the group consisting of polyethylene, polypropylene, polyamides, acrylonitrile-butadiene-styrene copolymers, stryene-butadiene copolymers, polyurethanes, and polycarbonates.

13. The method of making the animal collar defined in claim 1 by injecting said thermosetting plastic material into a mold and thereafter curing said thermosetting plastic material.

* * * * *